United States Patent
Hawkes et al.

(10) Patent No.: US 6,776,654 B2
(45) Date of Patent: Aug. 17, 2004

(54) CONDUIT RETAINING CLIP

(75) Inventors: David Jon Hawkes, Arkadelphia, AR (US); James Edward Barnes, Arkadelphia, AR (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 10/116,623

(22) Filed: Apr. 4, 2002

(65) Prior Publication Data
US 2003/0190835 A1 Oct. 9, 2003

(51) Int. Cl.⁷ .............................................. H01R 13/73
(52) U.S. Cl. ...................... 439/551; 439/454; 174/65 R
(58) Field of Search ................................. 439/454, 551; 174/65 R, 153, 79, 79 R

(56) References Cited

U.S. PATENT DOCUMENTS

| | | |
|---|---|---|
| 4,059,325 A | 11/1977 | Diminnie et al. |
| 4,109,992 A | 8/1978 | Hughes et al. |
| 4,151,363 A * | 4/1979 | Nichols ................ 174/65 R |
| 4,227,764 A | 10/1980 | Fiske |
| 4,252,394 A | 2/1981 | Miller |
| 4,523,798 A | 6/1985 | Barrows et al. |
| 4,584,433 A | 4/1986 | Bowsky et al. |
| 4,654,470 A | 3/1987 | Feldman et al. |
| 4,712,157 A | 12/1987 | Simonson et al. |
| 4,827,502 A | 5/1989 | Suffi et al. |
| 4,840,547 A | 6/1989 | Fry |
| 4,915,638 A | 4/1990 | Domian |
| 4,921,454 A | 5/1990 | Atherton et al. |
| 4,984,973 A | 1/1991 | Itameri-Kinter et al. |
| 4,998,891 A | 3/1991 | Bresko |
| 5,007,854 A | 4/1991 | Crespiatico et al. |
| 5,035,653 A | 7/1991 | Honkomp et al. |
| 5,084,596 A | 1/1992 | Borsh et al. |
| 5,091,821 A | 2/1992 | Peyton |
| 5,120,237 A | 6/1992 | Fussell |
| 5,126,608 A | 6/1992 | Sogabe et al. |

(List continued on next page.)

OTHER PUBLICATIONS patent application filed May 17, 2001, Ser. No. 09/859,390, entitled "Electric Power Supply Connector For Sealed Compressor".

*Primary Examiner*—Tho D. Ta
*Assistant Examiner*—Larisa Tsukerman
(74) *Attorney, Agent, or Firm*—Carlson, Gaskey & Olds

(57) ABSTRACT

A compressor comprises a compressor pump unit and a motor for driving the pump unit. A compressor housing surrounds the compressor pump unit and the motor. A cable supplies power to the motor through a power supply housing mounted to the compressor housing. The power supply housing has a fence with a slot that permits insertion of the cable along a first axis and removal of the cable along a second axis transverse to the first axis. A clip couples the cable to the power supply housing, limiting movement of the cable along the second axis.

11 Claims, 6 Drawing Sheets

U.S. PATENT DOCUMENTS

| | | |
|---|---|---|
| 5,129,843 A | 7/1992 | Bowsky et al. |
| 5,145,388 A | 9/1992 | Brownlie et al. |
| 5,145,417 A | 9/1992 | Honkomp et al. |
| 5,173,057 A | 12/1992 | Bunch et al. |
| 5,194,012 A | 3/1993 | Cairns |
| 5,199,898 A | 4/1993 | Wisner |
| 5,239,129 A | 8/1993 | Ehrenfels |
| 5,244,408 A | 9/1993 | Muller et al. |
| 5,252,083 A | 10/1993 | Correnti |
| 5,256,072 A | 10/1993 | Hatagishi |
| 5,272,297 A | 12/1993 | Reichow et al. |
| 5,336,105 A | 8/1994 | Wisner |
| 5,391,061 A | 2/1995 | Iizuka et al. |
| 5,413,502 A * | 5/1995 | Wang .......................... 439/551 |
| 5,425,626 A | 6/1995 | Tojo et al. |
| 5,430,619 A | 7/1995 | Lindenbaum |
| 5,769,659 A | 6/1998 | Ceylan |
| 6,248,952 B1 * | 6/2001 | Reeves et al. ............ 174/65 R |
| 6,259,034 B1 * | 7/2001 | Arthur .................... 174/153 G |
| 6,290,528 B1 | 9/2001 | Moore, Jr. et al. |

* cited by examiner

CONDUIT RETAINING CLIP

BACKGROUND OF THE INVENTION

This invention relates to a clip for a power supply housing of a compressor canister.

Compressors are typically mounted within a sealed housing structure, such as a shell. The housing structure receives a compressor pump unit and an electric motor for driving the compressor pump unit. Refrigerant flows within the compressor housing for cooling the electric motor. The motor requires a source of current to power its windings. One recent power supply for a sealed compressor communicates power to the electric motor from a removable cable located on the outside of the housing structure. The cable is connected to terminals that act as electrical contacts to carry the power to the electric motor within the housing structure.

In this type of compressor, a protective cover, such as a power supply housing, serves to create a barrier between the terminal ends and the environment. This power supply housing is attached to the compressor canister. The power supply housing may comprise two pieces: a terminal fence or wall that attaches to the compressor canister and a cover which connects to the terminal fence. This two-piece assembly permits an installer to make the terminal connections between the cable and the canister and then place the cover over the terminal fence.

The terminal fence has a slot to permit the cable to pass through its wall. The slot is generally u-shaped to permit the cable to be quickly laid in the slot of the fence. This feature, however, also allows the cable to slip out of the slot or at least move somewhat after installation. Moreover, a protective tube or conduit comprising a hollow cylinder may receive the cable and serve to seal the slot around the cable. This conduit may be secured axially along the cable's length but may also slip out of the U-shaped opening or move within the spring after installation.

A need therefore exists to better secure the cable and protective conduit to their proper location about the slot.

SUMMARY OF THE INVENTION

The invention comprises a compressor assembly. As known, the assembly has a compressor pump unit and a motor powering the pump unit. A housing surrounds the compressor pump unit and the motor, providing a protective and sealed environment. A cable communicates electricity to the motor through electrical contacts on the housing. Protecting the contacts from the environment is a power supply housing. The power supply housing has a slot to receive the cable. This slot permits insertion of the cable into the housing along a first axis and also permits removal of the cable along a second axis transverse to the first axis. A clip serves to connect the cable to the housing and limit movement of the cable along the second axis.

In addition, the compressor may have a conduit disposed around the cable to provide further protection of the cable and the electrical contacts. The conduit may comprise a threaded portion that mates with a nut. The conduit is inserted into the slot and the nut tightened around the slot and within the housing, thereby preventing the conduit from moving along the first axis outwardly of the slot.

A lip may be formed around the slot. In this instance, the clip may connect to this lip. The clip may comprise a ring having one leg that engages the lip and prevents movement of the cable along the second axis. Preferably, more legs may be formed on the clip to better secure the clip to the lip of the slot. The legs of the clip may expand to permit the clip to be snapped onto the lip. A cover may be placed over the fence to provide additional protection for the electrical contacts of the compressor housing.

Accordingly, a cable may be set into the slot of the power supply housing of the compressor. The cable is then secured to the power supply housing along a first axis. The cable is clipped to this housing to prevent movement of the cable along a second axis transverse to the first axis. The clip may attach to a conduit disposed around the cable. In this way, the cable is secured to the slot. Once secured in this fashion, an installer is then free to make the necessary terminal connections between the cable and the compressor motor without concern of having the cable slip out of the slot.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
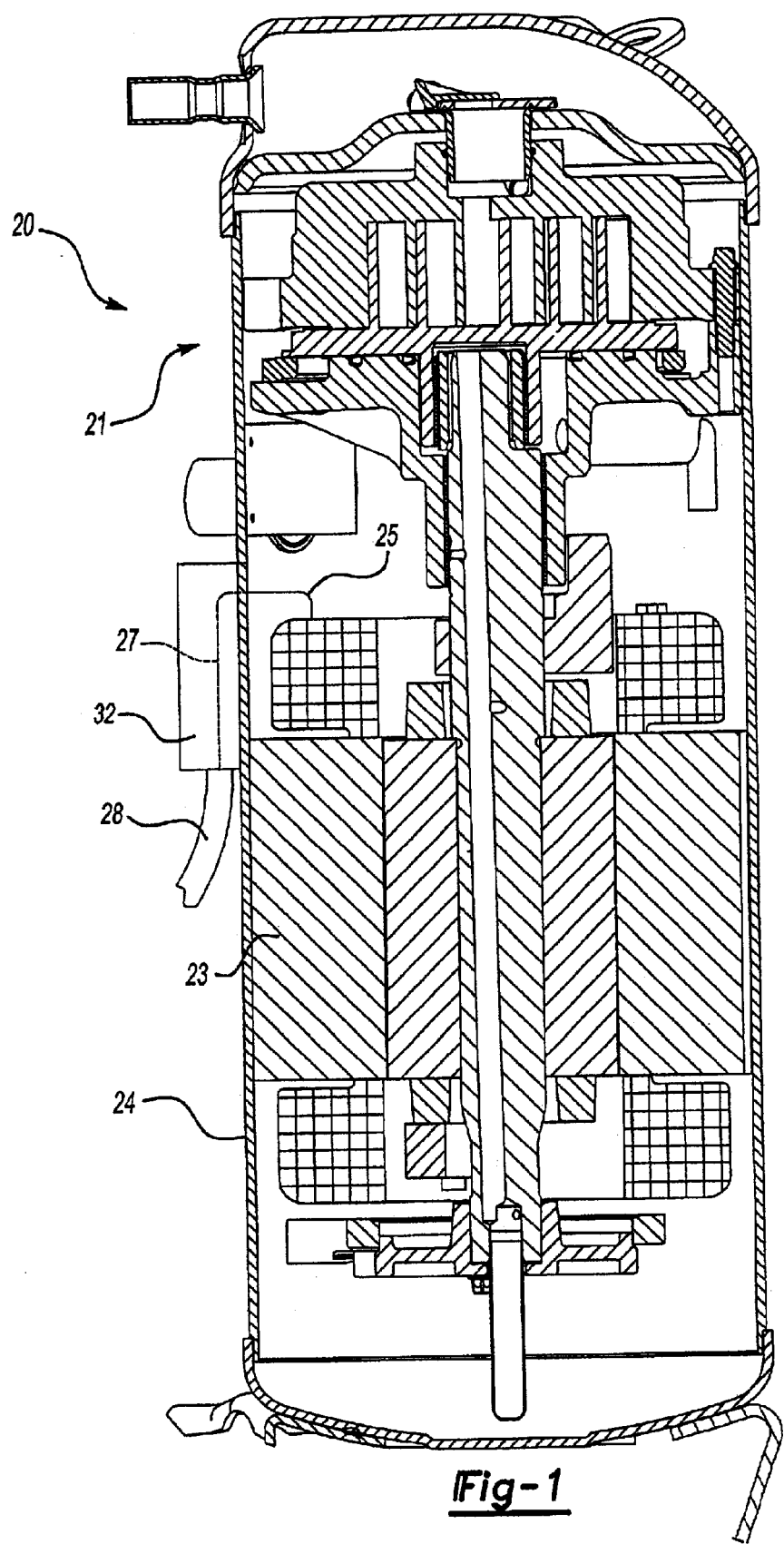
FIG. 1 shows compressor housing, power supply housing, and cable.

FIG. 1 illustrates an environmental view of the invention, compressor 20. As known, compressor 20 comprises a compressor pump unit 21 and an electric motor 23 supported and protected by compressor housing 24. The pump unit 21 is preferably a scroll compressor, as shown, but other sealed compressors will benefit from this invention. Power is supplied to compressor 20 and to motor therein by cable 28, which may be connected to a source of electrical power. Power supply housing 32 is mounted to compressor housing 24 and provides protection for the electrical interface between cable 28 and the interior of compressor housing 24. Housing 32 is preferably provided with terminal connections to the motor, and is preferably potted. The power supply housing interior may be generally as described in U.S. Pat. No. 6,290,528. As shown, wires 25 (shown schematically) connect housing 32 to motor 23. Cable 28 is connected to wires 25 such as shown at 27 within housing 32.

Figure 2:
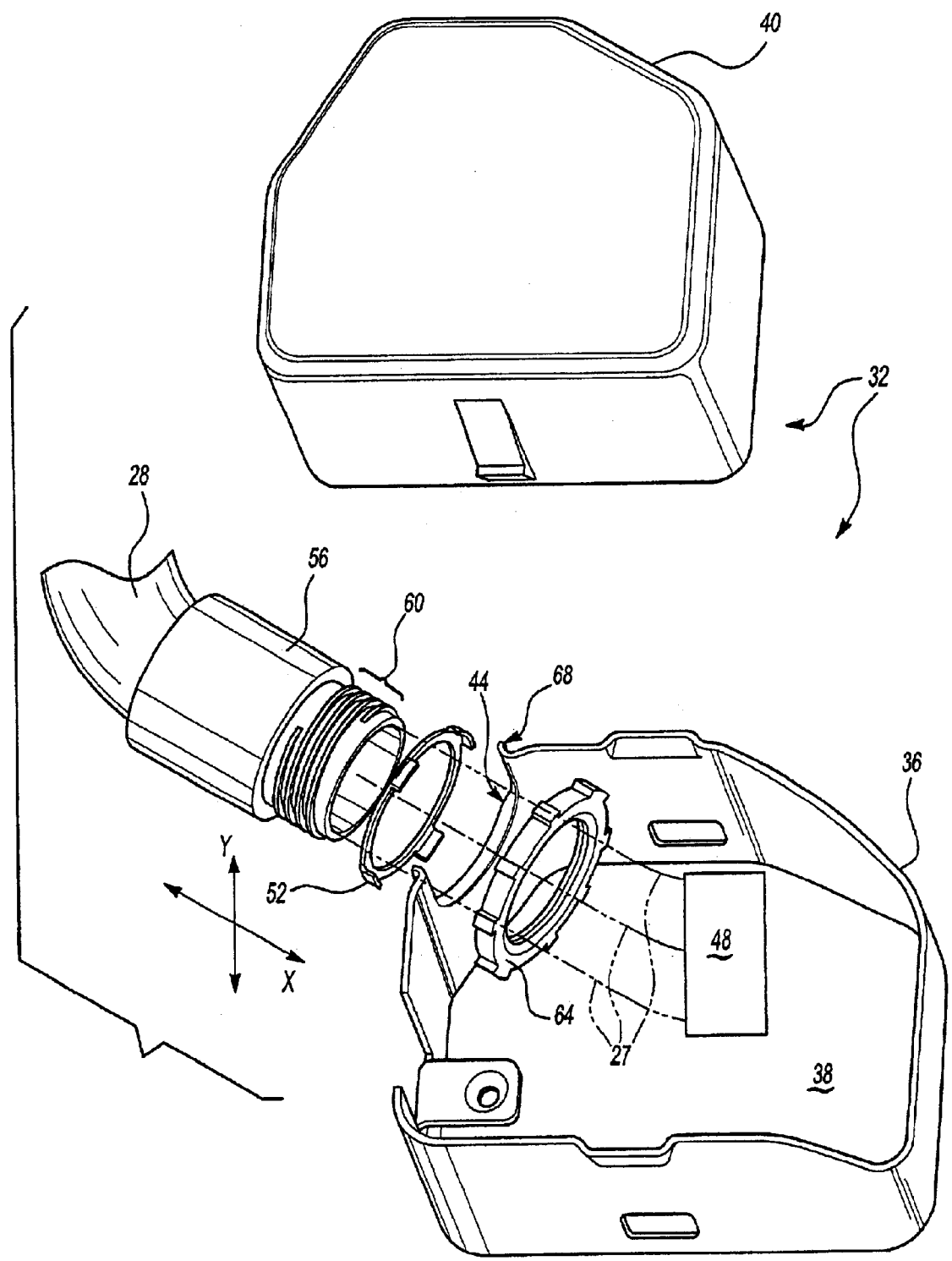
FIG. 2 illustrates an exploded view of the power supply housing including cable, conduit, clip, nut and terminal connections.

FIG. 2 illustrates an exploded greatly simplified view of power supply housing 32. As shown from this view, power supply housing 32 comprises fence 36 and cover 40. Fence 36 has slot 44, which may be a u-shaped opening in fence 36. Fence 36 comprises a wall with an interior room 38 where cable 28 connects to terminal ends 48, which are the electrical contacts for supplying power to the motor. Cable 28 may be inserted along the x-axis or laid onto slot across the y-axis as a consequence of the u-shaped opening of slot 44. In addition, cable 28 is also removable along both the x-axis and y-axis. The x-axis is orthogonal to the y-axis as shown here.

Disposed around cable 28 is conduit 56, which comprises a hollow cylinder to permit the insertion of cable 28 and to seal slot 44 from the environment. Threaded portion 60 is insertable through slot 44. Nut 64 mates with threaded portion 60 inside the housing 32 to secure conduit 56 along the x-axis. Clip 52 provides the inventive aspect of this assembly by securing cable and conduit 56 along the y-axis.

Figure 2A:
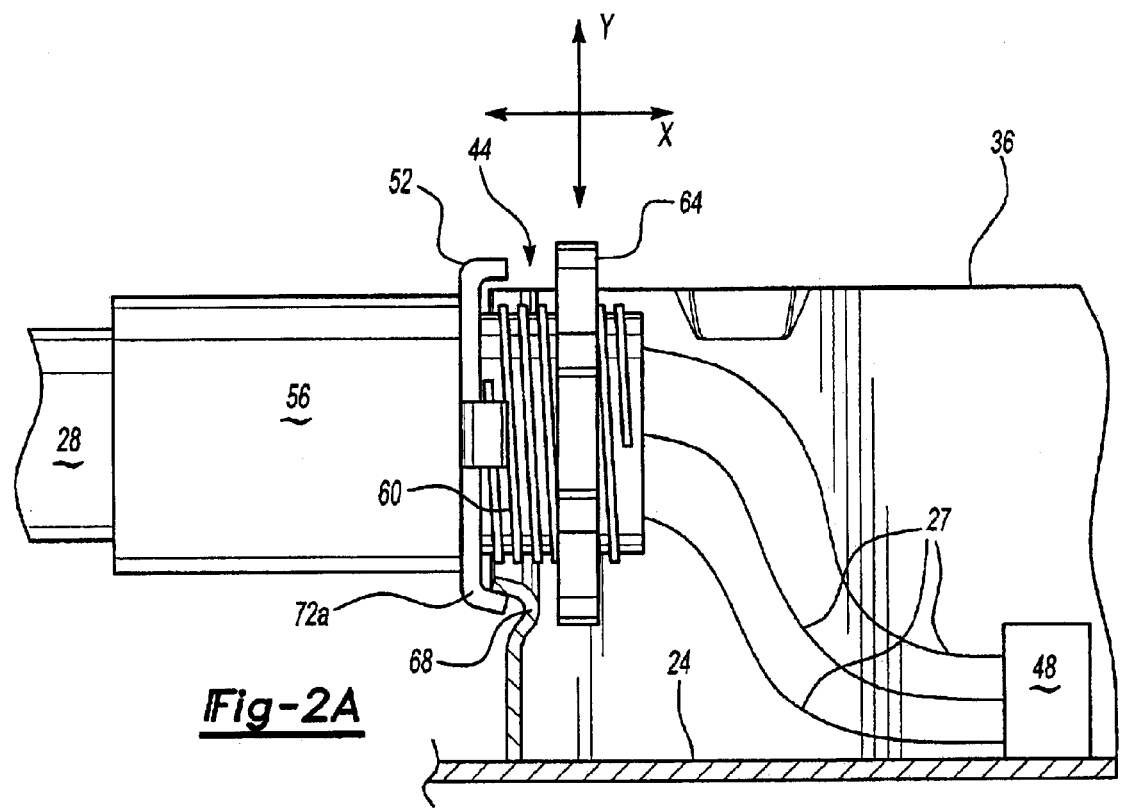
FIG. 2A shows a cross sectional view of the embodiment of FIG. 2.

FIG. 2A better illustrates this inventive feature. This figure shows a cross-sectional view of the embodiment of FIG. 2. As shown, cable 28 and conduit are inserted through slot 44. Surrounding slot 44 is lip 68, a protrusion formed on fence 36. Nut 64 is tightened on threaded portion 60 of conduit 56, preventing conduit 56 from moving along the x-axis. Clip 52 is disposed around both conduit 56 and cable 28. In addition, leg 72A of clip 52 contacts lip 68 of fence 36, thereby limiting movement of conduit 56 and cable 28 along the y-axis. Clip 52 accordingly locks conduit 56 and cable 28 in place to reduce movement of cable 28 and protect the connection of terminals 48. Accordingly, cable 28 and conduit 56 are secured along the y-axis.

Figure 3:
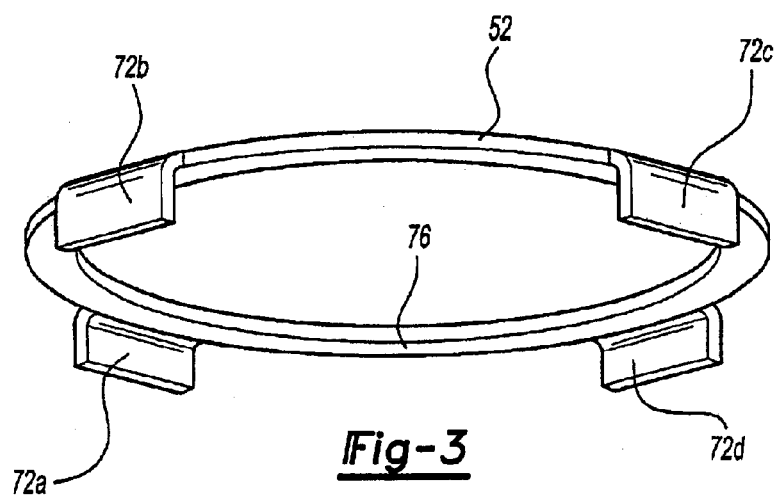
FIG. 3 illustrates the clip of FIGS. 2 and 3.
Figure 4:
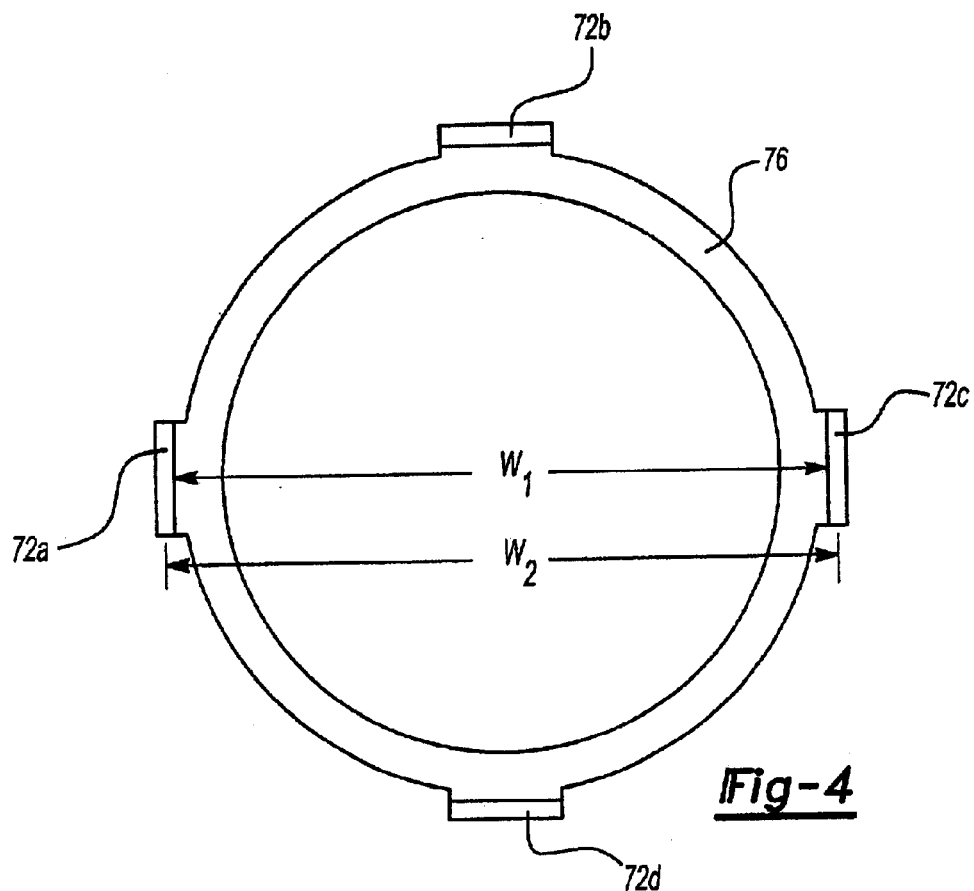
FIG. 4 illustrates an alternative view of the clip of FIG. 3.

FIG. 3 illustrates a close up view of the inventive clip 52. Clip 52 comprises ring 76 having four legs, 72A, 72B, 72C and 72D. Clip 52 is made of a resilient material, such as steel. As shown in FIG. 4, legs 72A, 72B, 72C and 72D are spaced radially about equal distance from each other along ring 76. Legs 72A and 72C are also spaced apart an unflexed distance W1. Due to the resilient nature of the material used, legs 72A and 72C may expand to a distance W2 greater than W1. Leg 72B and 72D may share a similar relationship.

Figure 5:
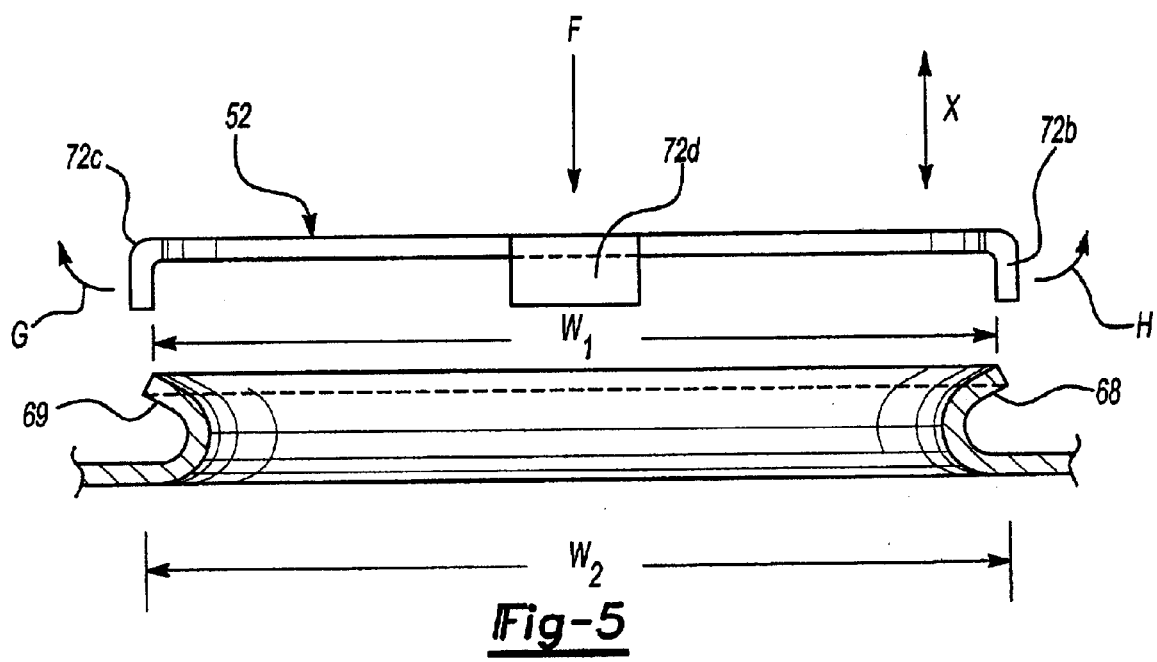
FIG. 5 illustrates a cross sectional view of the clip placed over the lip of the fence of the cable housing of FIGS. 2 and 2A.

As shown in FIG. 5, clip 52 may be snapped onto lip 68 by positioning clip 52 over lip 68 and moving clip 52 along the direction of arrow F, which is also along the x-axis. As legs 72B and 72C contact lip 68, they flex outward expanding from distance W1 to width W2. While leg 72D does not contact lip 68, leg 72A will contact lip 68 and thereby be displaced so that distance between leg 72A and 72D is greater than W1. For example, lip 68 contacts leg 72B pushing leg 72B in the direction of arrow H while lip 68 contacts leg 72C and pushes leg 72C in the direction of arrow G. Leg 72A also operates in the same manner. As can be seen, a ramped outer surface 69 of lip 68 facilitates the movement.

Figure 6:
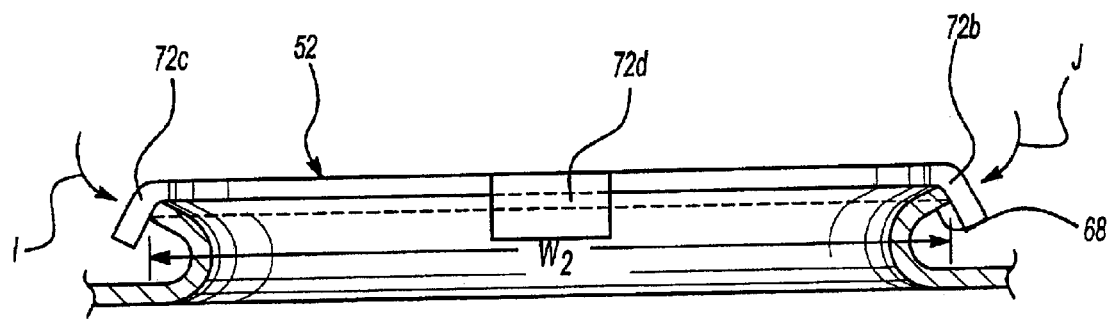
FIG. 6 illustrates the placement of the clip on the lip of the fence of FIG. 5.

As shown in FIG. 6, once clip 52 is placed completely on lip 68, legs 72A, 72B and 72D of clip 52 apply force around lip 68. The lip 72A is not shown in FIG. 6, but as can be seen in FIG. 2A, it would directly block movement out of the slot. For example, leg 72C applies force in the direction of arrow I while leg 72B applies force in the direction of arrow J. Clip 52 is thereby retained on lip 68. In both of these figures, it should be noted that leg 72D is not in contact with lip 68 due to its placement over the opening of slot 44. While only three legs operate to retain clip 52 onto lip 68, a fourth leg offers the installer of clip 52 the convenience of an additional leg to align clip 52 on lip 68 and to ensure contact of a leg on lip.

Figure 7:
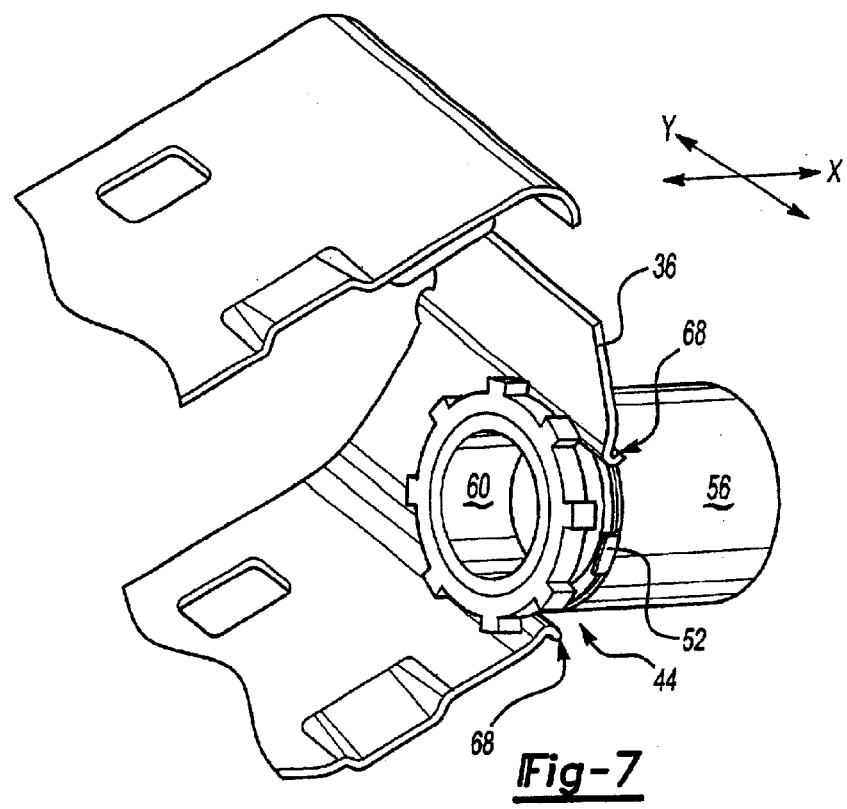
FIG. 7 illustrates a perspective view of the clip assembled with conduit and nut.

FIG. 7 illustrates the assembly without a cover. Fence 36 is connected to conduit 56 with conduit 56 secured along two different directions by two connectors. Nut 64 secures conduit 56 along the x-axis while clip 52 secures conduit 56 along the y-axis.

Figure 8:
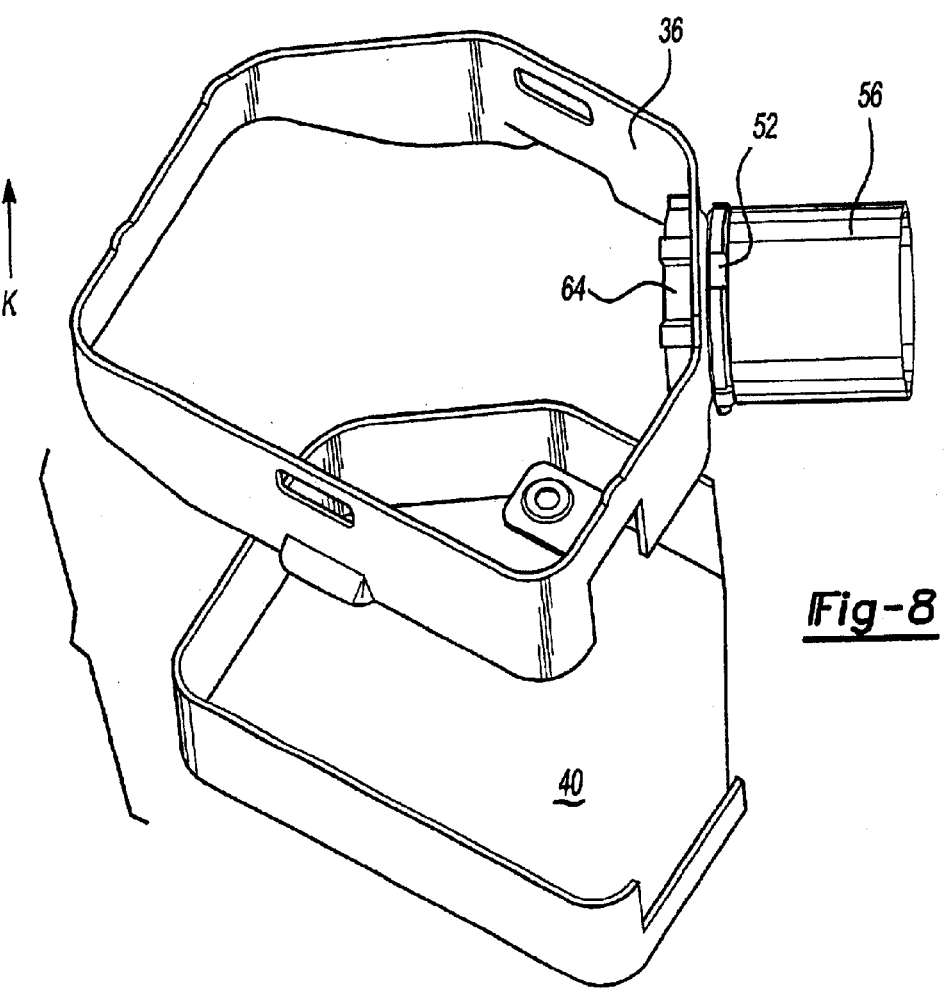
FIG. 8 illustrates another view of the embodiment of FIG. 7 with the cover removed.

FIG. 8 shows the assembly with cover 40. Fence 36, clip 52, conduit 56, and nut 64 are also shown. Cover 40 may be snapped into fence 36 as known by inserting cover 40 into fence 36 along arrow K. Once these features have been secured and cable 28 connected to terminal ends 48, cover 40 may be placed within fence 36 by moving cover 40 in the K direction, which is toward compressor pump unit 21.

Figure 9:
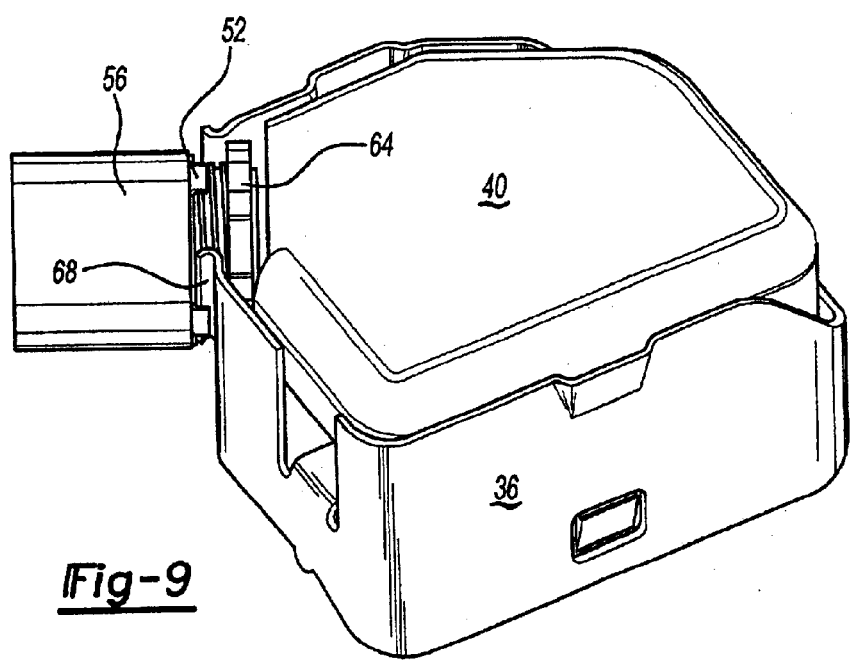
FIG. 9 illustrates the embodiment of FIG. 8 with cover snapped to the fence.

FIG. 9 illustrates the final assembly with cover placed within fence 36. As shown, conduit 56 is secured to fence 36 by clip 52 and nut 64. Clip 52 connects conduit 56 to lip 68 of fence 36.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A compressor comprising:
   a compressor pump unit and a motor for driving said compressor pump unit;
   a compressor housing surrounding said compressor pump unit and said motor;
   a cable for supplying power to said motor in communication with said motor;
   a power supply housing mounted to said compressor housing, comprising a fence with a slot that permits insertion of said cable along a first axis into said housing and removal of said cable along a second axis transverse to said first axis; and
   a clip coupling said cable to said power supply housing, limiting movement of said cable along said second axis.

2. The compressor of claim 1 including a conduit disposed around said cable wherein said clip connects said conduit to said power supply housing.

3. The compressor of claim 2 wherein said conduit comprises a threaded portion insertable into said slot.

4. The compressor of claim 3 including a nut disposed about said threaded portion and within said housing, limiting movement of said conduit along said first axis.

5. A compressor comprising:
   a compressor pump unit and a motor for driving said compressor pump unit;
   a compressor housing surrounding said compressor pump unit and said motor;
   a cable for supplying power to said motor in communication with said motor;
   a power supply housing mounted to said compressor housing, comprising a fence with a slot that permits insertion of said cable along a first axis into said housing and removal of said cable along a second axis transverse to said first axis;
   a clip coupling said cable to said power supply housing, limiting movement of said cable along said second axis; and
   said fence includes a lip of a predetermined size at least partially disposed around said slot.

6. The compressor of claim 5 wherein said clip comprises at least a partially annular ring having at least one leg engaging said lip.

7. The compressor of claim 6 wherein said at least one leg comprises at least three legs describing a first dimension of about said predetermined size of said lip and an expanded second dimension larger than about said predetermined size.

8. The compressor of claim 1 including a cover operatively connected to said fence.

9. A compressor comprising:
- a compressor pump unit and a motor for driving said compressor pump unit;
- a compressor housing surrounding said compressor pump unit and said motor;
- a cable for supplying power to said motor in communication with said motor;
- a power supply housing mounted to said compressor housing, comprising a fence with a slot that permits insertion of said cable along a first axis and removal of said cable along a second axis transverse to said first axis into said housing wherein said fence includes a lip of a predetermined size at least partially disposed around said slot;
- a conduit disposed around said cable, said conduit comprising a threaded portion insertable into said slot and a nut disposed about said threaded portion and within said housing, limiting movement of said conduit along said first axis; and
- a clip coupling said cable to said power supply housing, limiting movement of said cable along said second axis wherein said clip comprises at least a partially annular ring having at least one leg engaging said lip.

10. The compressor of claim 9 wherein said at least one leg comprises at least three legs describing a first dimension of about said predetermined size of said lip and an expanded second dimension larger than about said predetermined size.

11. The compressor of claim 9 including a cover operatively connected to said fence.

* * * * *